US 6,698,240 B1

(12) United States Patent
Tsumura et al.

(10) Patent No.: US 6,698,240 B1
(45) Date of Patent: Mar. 2, 2004

(54) APPARATUS FOR MANUFACTURING GLASS BASE MATERIAL AND A METHOD FOR MANUFACTURING GLASS BASE MATERIAL

(75) Inventors: Hiroshi Tsumura, Annaka (JP); Hiroyuki Koide, Annaka (JP); Yuuji Tobisaka, Annaka (JP); Kazuhisa Hatayama, Annaka (JP); Go Ogino, Annaka (JP); Tadakatsu Shimada, Annaka (JP); Hideo Hirasawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 63 days.

(21) Appl. No.: 09/585,573

(22) Filed: Jun. 2, 2000

(30) Foreign Application Priority Data

Jun. 3, 1999 (JP) .......................... 11-156274
Jun. 30, 1999 (JP) .......................... 11-184851
Jul. 13, 1999 (JP) .......................... 11-199110

(51) Int. Cl.⁷ .............................................. C03B 8/04
(52) U.S. Cl. ................. 65/17.4; 65/29.15; 65/29.19; 65/162; 65/379; 65/384; 65/488; 65/489
(58) Field of Search ..................... 65/17.4, 29.15, 65/29.19, 162, 355, 356, 379, 384, 413, 488, 489

(56) References Cited

U.S. PATENT DOCUMENTS

| 4,582,480 A | * | 4/1986 | Lynch et al. | ............. 261/121.1 |
| 5,250,097 A | * | 10/1993 | Saitoh et al. | .................. 65/355 |
| 6,161,398 A | * | 12/2000 | Partus | ........................ 264/1.24 |

FOREIGN PATENT DOCUMENTS

| EP | 0 040 540 | 11/1981 |
| EP | 0 949 212 | 10/1999 |
| JP | 9-110457 | * 4/1997 |
| WO | 86/01232 | 2/1986 |

OTHER PUBLICATIONS

Patent Abstracts of Japan, vol. 97, No. 8, Aug. 29, 1997 & JP 09 110457 A (NT&T Corp.), Apr. 28, 1997.
Patent Abstracts of Japan, vol. 13, No. 11, Jan. 11, 1989 & JP 63 218242 A (Sumitomo Electric Ind. Ltd.), Sep. 12, 1988.
Patent Abstracts of Japan, vol. 13, No. 290, Jul. 5, 1989 & JP 01 083663 A (Furukawa Electric Co. Ltd.), Mar. 29, 1989.

* cited by examiner

Primary Examiner—Sean Vincent
(74) Attorney, Agent, or Firm—Pillsbury Winthrop LLP

(57) ABSTRACT

An apparatus for manufacturing a glass base material which is an parent material of an optical fiber, comprising: a tank which contains a raw material of the glass base material to vaporize the raw material to generate a raw material in gas phase; a temperature control unit which controls a temperature of the raw material; and a pressure control unit which controls the pressure of the raw material in gas phase.

36 Claims, 4 Drawing Sheets

020
APPARATUS FOR MANUFACTURING GLASS BASE MATERIAL AND A METHOD FOR MANUFACTURING GLASS BASE MATERIAL

This patent application claims priority based on a Japanese patent applications, H11-156274 filed on Jun. 3, 1999, H11-184851 filed on Jun. 30, 1999, and H11-199110 filed on Jul. 13, 1999, the contents of which are incorporated herein by reference.

BACKGROUND OF THE INVENTION

1. Field of the Invention

The present invention relates to an apparatus and a method for manufacturing a glass base material, which is a parent material of an optical fiber.

2. Description of the Related Art

A raw material of an optical fiber is manufactured by hydrolyzing a raw material such as $SiCl_4$ or $GeCl_4$ by oxyhydrogen flame or hydrogen flame. The hydrolyzed raw material is accumulated on a starting material or grown from a seed crystal to form a porous glass base material. There are various methods for manufacturing a porous glass base such as an outside vapor deposition method (OVD method) and a vapor-phase axial deposition method (VAD method). The porous glass base material is dehydrated and sintered, to form a glass base material having a large diameter. A glass fiber preform is formed by reducing the diameter of the glass base material, which has large diameter. The glass fiber preform is drawn, thus producing a glass fiber.

The raw material such as $SiCl_4$ or $GeCl_4$ is vaporized in a vaporizing unit for supply to a hydrolyzing process. A vaporizing unit vaporizes the raw material by heating the raw material under atmospheric pressure. If the vaporizing unit is continuously used, the raw material is kept at a high temperature for a long period which induces autolysis. This is partial hydrolyzation caused by the small amount of water existing as a foreign impurity, gelation, and crystallization of foreign impurities. Therefore, the purity of the raw material decreases, and thus the quality of the glass base material also decreases.

An apparatus called a bubbler is also used as the vaporizing unit. The bubbler heats the raw material to a lower temperature under a decompressed condition, and bubbles a carrier gas such as oxygen or argon through the raw material. The bubbler may cause a clog in a supplying pipe which supplies the raw material for the hydrolyzing process, or a valve, which is provided on the supplying pipe, after a long period of continuous use. The clog may cause fluctuation of an equilibrium vapor pressure so that the partial pressure of the raw material among a mixture of the raw material in gas phase and a carrier gas, fluctuates. If the partial pressure of the raw material fluctuates, the hydrolyzed raw material cannot be accumulated homogeneously. Therefore, the quality of the glass base material is not uniform and stable.

The constituent components of the apparatus for manufacturing the porous glass base material must be exchanged if the constituent components are clogging due to the gel material and foreign impurities contained in the material gas. When the constituent components are exchanged, the material gas may contact with water contained in open air, thus causing formation of another gel material and corrosive gas that can cause a new clog. Therefore, air in the exchanged component must be completely removed and replaced with the gas raw material and the carrier gas each time following exchange of the constituent components. It takes time and labor to exchange the constituent components, so that the productivity for manufacturing the glass base material decreases.

SUMMARY OF THE INVENTION

Therefore, it is an object of the present invention to provide an apparatus for manufacturing a glass base material and method for manufacturing glass base material which overcome the above issues in the related art. This object is achieved by combinations described in the independent claims. The dependent claims define further advantageous and exemplary combinations of the present invention.

According to the first aspect of the present embodiment, an apparatus for manufacturing a glass base material which is a parent material of an optical fiber, comprises: a tank which contains a raw material of the glass base material, within which vaporization of the raw material occurs, to generate a raw material in gas phase; a temperature control unit which controls a temperature of the raw material; and a pressure control unit which controls pressure of the raw material in gas phase.

The apparatus can be provided such that the tank may include a gas phase region, which contains the raw material in gas phase; and a liquid phase region, which contains the raw material in liquid phase. The temperature control unit and the pressure control unit may control the partial pressure of the raw material in gas phase in the gas phase region by controlling an equilibrium vapor pressure in the gas phase region and the liquid phase region. The pressure control unit may have a carrier gas supply unit, which supplies a carrier gas for controlling the equilibrium vapor pressure by bubbling the carrier gas through the liquid phase region. The carrier gas supply unit may have a carrier gas cylinder, which supplies the carrier gas to the carrier gas supply unit.

The apparatus may further comprise at least one reaction vessel where the raw material in gas phase is supplied and the glass base material is formed by hydrolyzing the raw material in gas-phase. The apparatus may additionally comprise a gas material supply valve that controls the flow rate of the raw material in gas phase from the tank to the reaction vessel, and a filter which filters the raw material in gas phase supplied to the reaction vessel. The filter may be formed by a membrane that has a transmitting hole for filtering the raw material in gas phase. A diameter of the transmitting hole may be substantially from 0.1 μm to 100 μm. The membrane may be made of a politetrafluoroethylene, a stainless sinter, a stainless fiber, or a ceramic filter. The filter may have a plurality of layers of membranes.

The reaction vessel may have a cooling unit which cools the reaction vessel, and the cooling unit may circulate cooling water which contains anticorrosive chemicals inside the cooling unit. The anticorrosive chemicals may include policarboxylic acid nitrite. The cooling water may contain the policarboxylic acid nitrite at a concentration from 1 ppm to 10 ppm. The anticorrosive chemicals may further include inorganic nitride. The cooling water may contain each of the policarboxylic acid nitrite and inorganic nitride at concentrations from 1 ppm to 10 ppm. Temperature of the cooling water may be substantially from 40° C. to 90° C., preferably substantially from 50° C. to 80° C. The cooling water may contain an antiblastic agent that suppresses an increase of bacteria.

According to second aspect of the present embodiment, a method for manufacturing a glass base material can be provided such that the method comprises: providing a raw material of the glass base material, heating the raw material to vaporize the raw material and generate a raw material in gas phase, supplying a carrier gas to reduce a partial pressure of the raw material in gas phase to vaporize the raw material, controlling a temperature of the raw material by adjusting the heating of the raw material, and controlling the partial pressure of the raw material in gas phase by adjusting the supply of the carrier gas. The method may further comprise, supplying and hydrolyzing the raw material in gas phase to form the glass base material.

The method may further comprise, filtering the raw material in gas phase and supplying and hydrolyzing the filtered raw material in gas phase. The method may further comprise, controlling a flow rate of the raw material in gas phase and supplying and hydrolyzing the flow rate controlled raw material in gas phase. Supplying and hydrolyzing the raw material in gas phase may hydrolyze the raw material in gas phase, in a reaction vessel; and the hydrolyzing may include cooling the reaction vessel by circulating cooling water around the reaction vessel. The cooling may cool the reaction vessel with cooling water that contains anticorrosive chemicals. The anticorrosive chemicals may include policarboxylic acid nitrite. The cooling water may contain policarboxylic acid nitrite at a concentration substantially from 1 ppm to 10 ppm. The anticorrosive chemicals may further include inorganic nitride. The cooling water may contain inorganic nitride at a concentration substantially from 1 ppm to 10 ppm. The cooling may regulate a temperature of the cooling water substantially from 40° C. to 90° C., preferably from 50° C. to 80° C. The cooling water may contain an antiblastic agent that suppresses an increase of bacteria in the cooling water.

This summary of the invention does not necessarily describe all necessary features so that the invention may also be a sub-combination of these described features.

DETAILED DESCRIPTION OF THE INVENTION

The invention will now be described based on the preferred embodiments, which do not intend to limit the scope of the present embodiment, but exemplify the invention. All of the features and the combinations thereof described in the embodiment are not necessarily essential to the invention.

Figure 1:
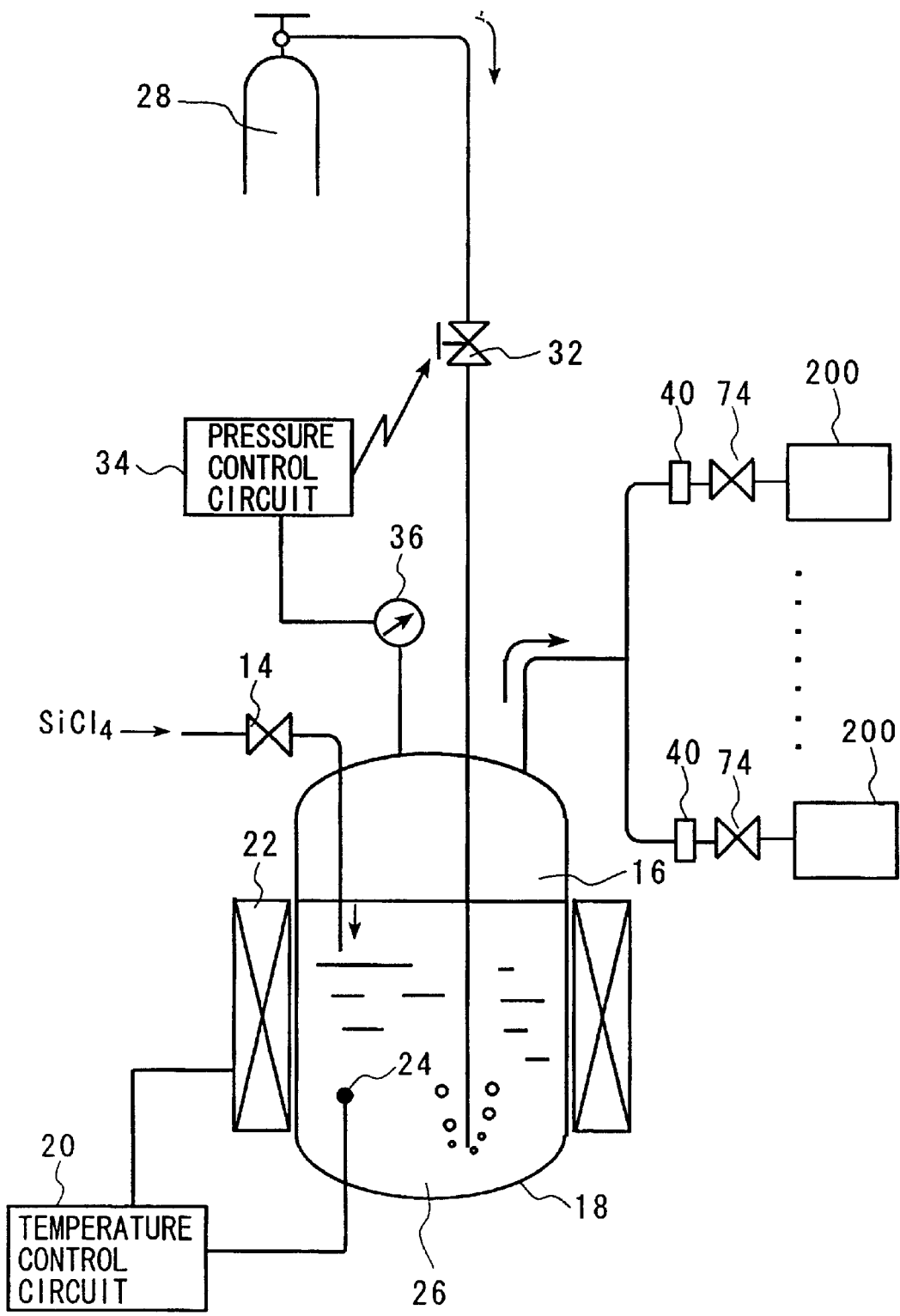
FIG. 1 shows a configuration of a glass base material manufacturing system of the present embodiment.

FIG. 1 shows a configuration of the glass base material manufacturing system of the present embodiment. The glass base material manufacturing system has a tank 18, a liquid material supply control valve 14, a temperature sensor 24, a temperature control circuit 20, a heat source 22, a pressure sensor 36, a pressure control circuit 34, a carrier gas control valve 32, a carrier gas cylinder 28, and a plurality of reaction units 200. The tank 18 includes a liquid phase region 26 and a gas phase region 16. The temperature control circuit 20, the heat source 22, and the temperature sensor 24 constitute a temperature control unit. The carrier gas control valve 32, the pressure control circuit 34, and the pressure sensor 36 constitute a pressure control unit. The carrier gas cylinder 28 is a carrier gas supply unit that supplies a carrier gas to the tank 18. The glass base manufacturing system further has a filter 40 and a gas material supply control valve 74, which are provided between the tank 18 and each of the plurality of reaction units 200.

A raw material of a porous glass base material in liquid phase, or a liquid raw material, is supplied to the tank 18. The liquid material supply control valve 14 controls a flow rate of liquid raw material flowing into the tank 18. The tank 18 includes the liquid phase region 26 that contains liquid raw material, for example $SiCl_4$, as a raw material. The tank 18 further includes the gas phase region 16 that contains a raw material in gas phase, or a gas raw material.

The temperature sensor 24 detects a temperature of liquid raw material. The temperature control circuit 20 controls the heat source 22 based on the temperature detected by the temperature sensor 24. The heat source 22 heats and vaporizes the liquid raw material in the tank 18 to generate a gas raw material. The carrier gas cylinder 28 supplies a carrier gas such as Argon to the liquid phase region 26 in the tank 18, to reduce partial pressure of the gas raw material in the gas phase region 16 inside the tank 18. The carrier gas control valve 32 controls the flow rate of carrier gas sent from the carrier gas cylinder 28 to the tank 18.

The pressure sensor 36 detects the pressure of the gas phase region 16. The pressure control circuit 34 controls the flow rate of the carrier gas supplied from the carrier gas cylinder 28 based on the pressure detected by the pressure sensor 36. The plurality of reaction units 200 hydrolyze the gas raw material supplied from the tank 18. An individual filter 40 is supplied to each of a plurality of the reaction units 200 in order to filter the gas raw material sent from the tank 18 to each of the reaction units 200. The gas material supply control valves 74 are supplied between the filter 40 and each of the plurality of reaction units 200, each of which controls the flow rate of the gas raw material sent from the filter 40 and supplied to the reaction units 200.

Because stainless steel has not only mechanical strength but also chemical stability, supplying pipes provided between the tank 18 and each of the reaction units 200 are preferably made from stainless steel. The tank 18, the pipe for supplying a liquid raw material to the tank 18, and the pipe for supplying the carrier gas to the tank 18 are also preferably made from stainless steel.

The process of manufacturing a glass base material will be explained as follows, referring to FIG. 1. The liquid raw material is supplied to the tank 18 through the liquid material supply control valve 14. The flow rate of liquid raw material is controlled by the liquid material supply control valve 14. The heat source 22 heats and vaporizes the liquid raw material inside the tank 18, to generate the gas raw material based on the direction signal output from the temperature control circuit 20. The carrier gas cylinder 28 supplies the carrier gas to the liquid phase region 26. The flow rate of the carrier gas is regulated by the carrier gas control valve 32 based on the direction signal output from the pressure control circuit 34.

The carrier gas is supplied and bubbled through the liquid phase region 26. By this bubbling process, the gas raw material and the carrier gas form a mixed gas material, which fills the gas phase region 16. The temperature control unit and the pressure control unit, control the partial pressure of the gas raw material in the gas phase region 16 by controlling the equilibrium vapor pressure between the gas phase region 16 and the liquid phase region 26. By controlling both the pressure and temperature, the gas raw material and the carrier gas are mixed in a predetermined ratio. Because the present embodiment can keep the partial pressure of the gas raw material in the mixed gas material constant, the quality of the glass base material manufactured by the glass base material manufacturing system of the present embodiment stabilizes and becomes uniform. The liquid raw material can be vaporized at a lower temperature so that the autolysis of the raw material is reduced, and thus the vaporizing apparatus of the present embodiment can be used continuously and for a long period.

A porous glass base material was manufactured by the vaporizing apparatus described above. The tank 10 was filled with $SiCl_4$ in the liquid phase. The tank 10 had a 10 liter capacity and was made of stainless steel. Argon was used as a carrier gas. The pressure in the tank 10 was constantly controlled at 0.6 kg/cm$^2$. The temperature of the liquid $SiCl_4$ was maintained at 40° C. The mixed gas material of $SiCl_4$ and argon gas was generated in the vaporizing apparatus. The mixed gas material was supplied to thirteen of the reaction units 200. Each of the reaction units had one oxyhydrogen burner 88. Each of the reaction units 200 hydrolyzed and accumulated for 40 hours, to manufacture one glass base material 86.

When the manufacture of one glass base material 86 was completed, a gas material supply control valve 74 was closed. When starting the manufacture of the next porous material, the gas material supply control valve 74 was opened again and the burner 88 was reignited. Using always at least one burner 88, the vaporizing apparatus was employed for 4000 hours continuously. The amount of $SiCl_4$ gas supplied to all the burners 88 per hour ranged from minus 30 percent to plus 30 percent of the average supplied amount, according to the numbers of the burners 88 which were operating. The composition ratio between the $SiCl_4$ gas and argon gas was kept constant and supplied stably to each of the burners 88 during the manufacturing of the porous glass base material.

In this embodiment, the vaporizing apparatus is used for vaporizing the raw material of the porous glass base material. The apparatus described in the present embodiment can also be used for vaporizing halogenated alkyl silane or halogenated alkoxy silane. The apparatus can also be used for manufacturing artificial quartz.

Figure 2:
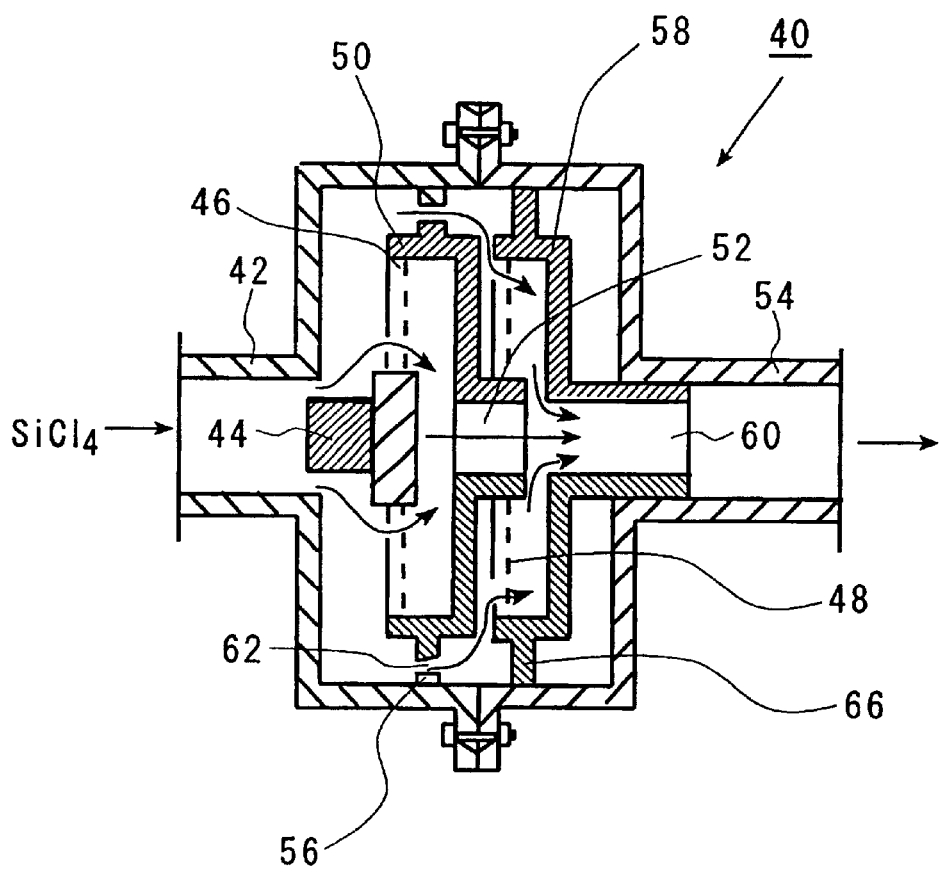
FIG. 2 shows a configuration of the filter 40 shown in FIG. 1.

FIG. 2 shows a configuration of the filter 40 shown in FIG. 1. The filter 40 is provided in front of each of a plurality of the reaction units 200 between the tank 18 and the reaction units 200. The filter 40 has a first housing 42, a second housing 54, a distributor 44, a first membrane holder 50, a second membrane holder 58, a first holder fixture 56, a second holder fixture 66, a first membrane 46, a second membrane 48, a first flue 52 and a second flue 60. The first holder 50 includes the first membrane 46 at the upper stream side of the flow of the mixed gas material, to filter the mixed gas material. The first holder 50 further includes the distributor 44 to divide the flow of the mixed gas material.

The first holder 50 is fixed inside the first housing 42. The first holder 50 further includes the first flue 52 at the down stream side of the flow of the mixed gas material to channel the mixed gas material to the down stream side of the second holder 58. The first holder 50 has an opening 62 on the connection part, which connects the first housing 42 and the first holder 50, to channel the mixed gas material to the second membrane 48 of the second holder 58. The second holder 58 includes the second membrane 48 at the upper stream side of the second holder 58. The second membrane 48 is supported by both the first membrane holder 50 and the second holder 58. The second holder 58 is fixed inside the second housing 54. The second holder 58 further includes the second flue 60 at the down stream side, to channel the mixed gas material to the down stream side of the second holder 58. The first housing 42 and the second housing 54 are connected to each other so that the first holder 50 and the second holder 58 are connected to each other to form the filter 40.

The mixed gas material generated in the tank 18 that contains gas raw material and carrier gas is sent to the reaction unit 200 to be hydrolyzed. The filter 40 filters the mixed gas material that is to be hydrolyzed. The mixed gas material sent from the tank 18 flows into the filter 40 and is distributed by the distributor 44 to each of the first membrane 46 and the second membrane 48. A part of the mixed gas material flows through the membrane 46, the first flue 52, and the second flue 60; the other part of the mixed gas material flows through the opening 62 which is provided on the first holder fixture 56, the second membrane 48 at the second holder 58, and the second flue 60.

The porous glass base material was filtered by the filter 40, as described above. A politetrafluoroethylene filter which had a 0.5 $\mu$m hole diameter was used for the membranes of the filter. A stainless steel pipe having an inside diameter 200 $\mu$m and an electric valve having a maximum opening hole diameter of 1000 $\mu$m were used for the gas material supply control valve 74. Whilst regulating the pressure of the gas raw material which contains $SiCl_4$ and $GeCl_4$ at 0.1 MPa, the apparatus for manufacturing the porous glass base material was employed for 8000 hours continuously. No clogs were generated, and the mixed gas material was stably supplied to the burners 88 for 8000 hours.

When the mixed gas material passes one of the first membrane 46 and the second membrane 48, any impurities or foreign matter contained in the mixed gas material are caught by one of the first membrane 46 and the second membrane 48. By filtering the mixed gas material before the mixed gas material is hydrolyzed, the mixed gas material is purified. Because the filter 40 can keep the quality of the mixed gas material constant, the quality of the glass base material manufactured by the present embodiment stabilizes. Because the filter of the present embodiment has two membranes of the first membrane 46 and the second membrane 48, the filter 40 can efficiently filter the mixed gas material. Here, the filter 40 has two membranes, however, the filter can have a plurality of membranes to purify the mixed gas material.

In this embodiment, the filter 40 is provided to the supply of the gas raw material of quartz glass. However, the filter 40 can also be provided to the pipe that supplies the combustible gas such as hydrogen, combustion supporting gas such as oxygen gas, or inert gas such as Argon or nitrogen, to the quartz glass synthesizing apparatus.

Figure 3A:
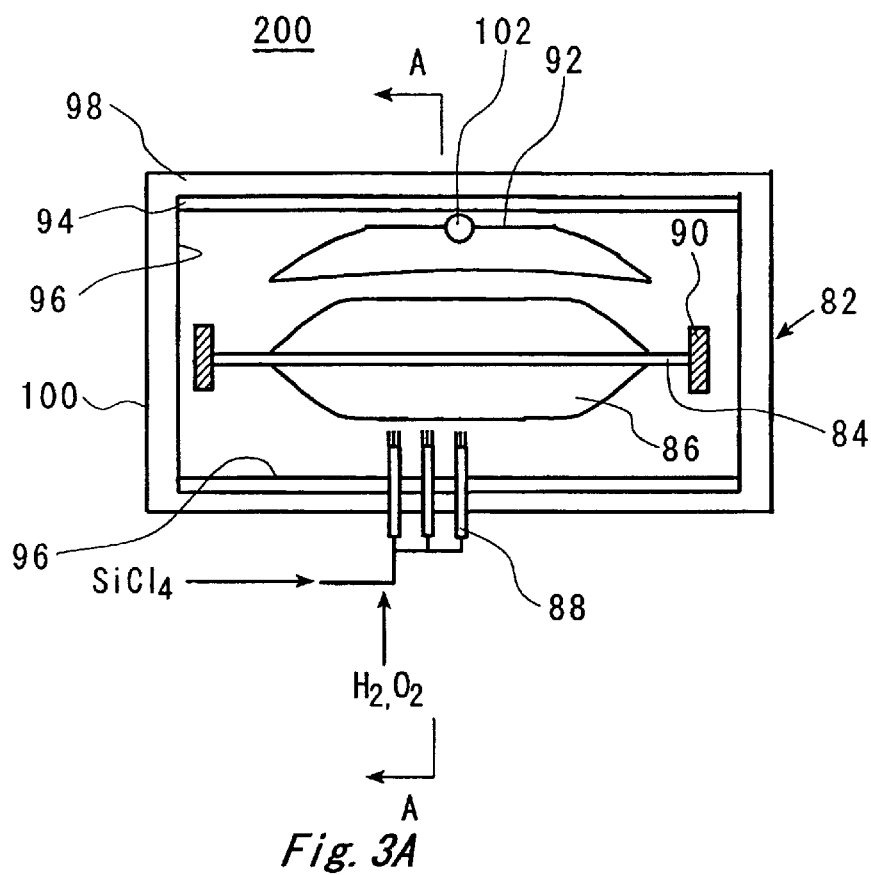
FIG. 3(A) shows an in detail configuration of the reaction unit 200 shown in FIG. 1.
Figure 3B:
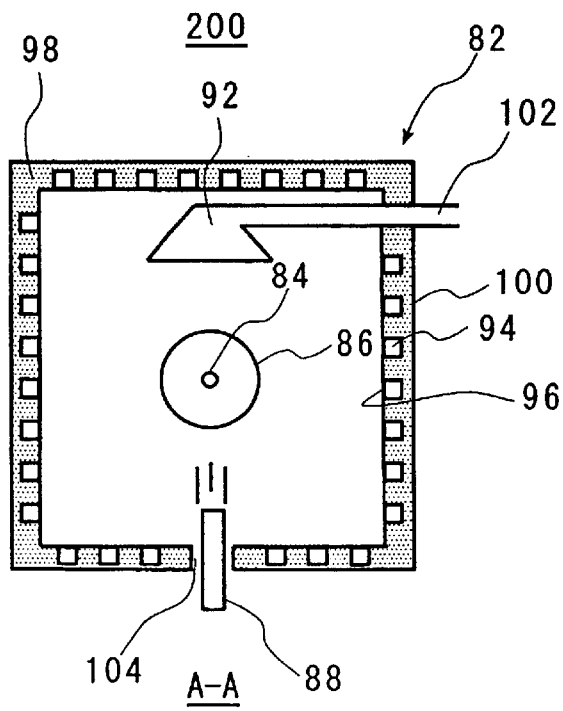
FIG. 3(B) shows an A—A cross section of the reaction unit 200 shown in FIG. 3(A).

FIGS. 3(A) and 3(B) show in detail a configuration of the reaction unit 200 shown in FIG. 1. FIG. 3(B) is an A—A cross section of the reaction unit 200 shown in FIG. 3(A). The reaction unit 200 has a burner 88, an axial rod 84, a rod holder 90, an emission hood 92, an exhaust duct 102, a slit 104, a reaction vessel 82, an inner wall 96, an insulation 98, an outer wall 100, a cooling channel 94. The outer wall 100, the insulation 98, the inner wall 96, and the cooling channel 94, constitute the reaction vessel 82.

The burner 88 hydrolyzes the gas raw material. The burner 88 is preferably a flame burner, which forms a porous glass base material, in order to form a homogenous porous glass base material. The axial rod 84 is provided inside the reaction vessel 82 on which the hydrolyzed gas raw material is accumulated. The rod holder 90 holds the axial rod 84 and rotates the axial rod 84 while accumulating the hydrolyzed raw material on the axial rod 84 to generate a glass base material 86. The emission hood 92 is provided on the top of the reaction vessel 82, and connected to an exhaust duct 102 to emit any exhaust gas outside. The inner wall 96 contains the axial rod 84, the rod holder 90, and the emission hood 92 inside. The outer wall 100 is provided on the outside of the inner wall 96. The insulation material 98 is filled between the inner wall 96 and the outer wall 100 to insulate the reaction vessel 82. The cooling channel 94 embedded in the insulation 98 is provided on the outside of the inner wall 96.

The mixed gas material that is generated in the tank 18 is supplied to the reaction unit 200. The mixed gas material is hydrolyzed in the reaction vessel 82. The rod holder 90 rotates the axial rod 84. The mixed gas material is hydrolyzed by the burner 88 and accumulates on the axial rod 84. A slit 104 is provided in the direction parallel to the glass rod 84 in the reaction vessel 82. While hydrolyzing the mixed gas material, the burner 88 moves back and forth along the slit 104. The rod holder 90 rotates the axial rod 84 so that the hydrolyzed gas raw material accumulates around and along the axial rod 84. Then the glass base material 86 is formed on the axial rod 84 in a spindle shape. The emission hood 92 vents any exhaust gas inside the reaction vessel 82 through the exhaust duct 102 during hydrolyzing of the mixed gas material. The cooling channel 94 contains cooling water inside.

During hydrolyzing of the mixed gas material, heat is supplied inside the reaction vessel 82 by burning the mixed gas material. The increase of the heat quantity inside the reaction vessel 82 increases the heat quantity that is supplied to the inner wall 96. The increase of the heat quantity increases stress arising in the reaction vessel 82. The stress caused by the increase in heat quantity may break the inner wall 96 and may reduce the life of the reaction vessel 82. If the inner wall 96 is broken, a part of the broken material in the inner wall 96 and the insulation 98 may attach and mix with the accumulated hydrolyzed raw material. If the glass base material 86 is contaminated by a part of the broken material in the inner wall 96 and the insulation 98, the quality of the glass base material 86 decreases. Therefore, transmission loss in the glass fiber which is the final product of the glass base material increases, or the glass fiber may be broken.

To prevent the problem described above, the reaction vessel 82 has the cooling channel 94. The cooling channel 94 contains and circulates cooling water around the inside the reaction vessel 82 to cool the reaction vessel 82.

The cooling water is circulated and heated in the cooling channel 94. The heated water is cooled by contact with air. The water absorbs oxygen whilst cooling in contact with air. The cooled water that absorbed oxygen is sent back to the cooling channel 94. The water that contains oxygen is heated in the cooling channel 94 and becomes high temperature water. High temperature water that contains oxygen can corrode the walls of the cooling channel 94 and can also cause rust on the walls of the cooling channel 94. The rust accumulated on the walls of the cooling channel 94 reduces the exchange rate in the cooling channel 94.

Therefore, the present embodiment of the cooling water contains an anticorrosive chemical to prevent corrosion and to maintain a high heat exchange rate. As an example of an anticorrosive chemical, a policarboxylic acid nitrite and an inorganic nitride may be preferably used. At a concentration of less than 1 ppm, the anticorrosive chemical does not efficiently prevent corrosion. At a concentration of more than 10 ppm, the efficiency of corrosion prevention of the anticorrosive chemical remains constant, even if the concentration of the anticorrosive chemical is increased. Furthermore, if the concentration is more than 10 ppm, the anticorrosive chemical may deposit in the cooling channel 94 and reduce the heat exchange efficiency. Therefore, the concentration of the anticorrosive chemical is preferably in the vicinity of from 1 ppm to 10 ppm.

The porous glass base material was manufactured by the reaction unit 200 described above. A cooling pipe made of stainless steel having a shape and size of 25 mm-square was used for the cooling channel 94. The cooling channels 94 were provided outside the inner wall 96 at a 100 mm interval, in a direction parallel to the glass rod 84. The cooling channels 94 were fixed to the inner wall 96 by spot welding a band at 300 mm intervals To gain the necessary heat transfer area, thermo cement was filled in both sides of the cooling channels 94. The insulation 98 made of $Al_2O_3$ and $SiO_2$ was provided between the inner wall 96 and the outer wall 100. The cooling water contains 6 ppm policarboxylic nitrite and 5 ppm inorganic nitride for as the anticorrosive chemicals. After three months of use, the cooling efficiency had not changed, as shown in FIG. 4, and no brown rust was detected, and thus the corrosion in the cooling channel was suppressed.

Figure 4:
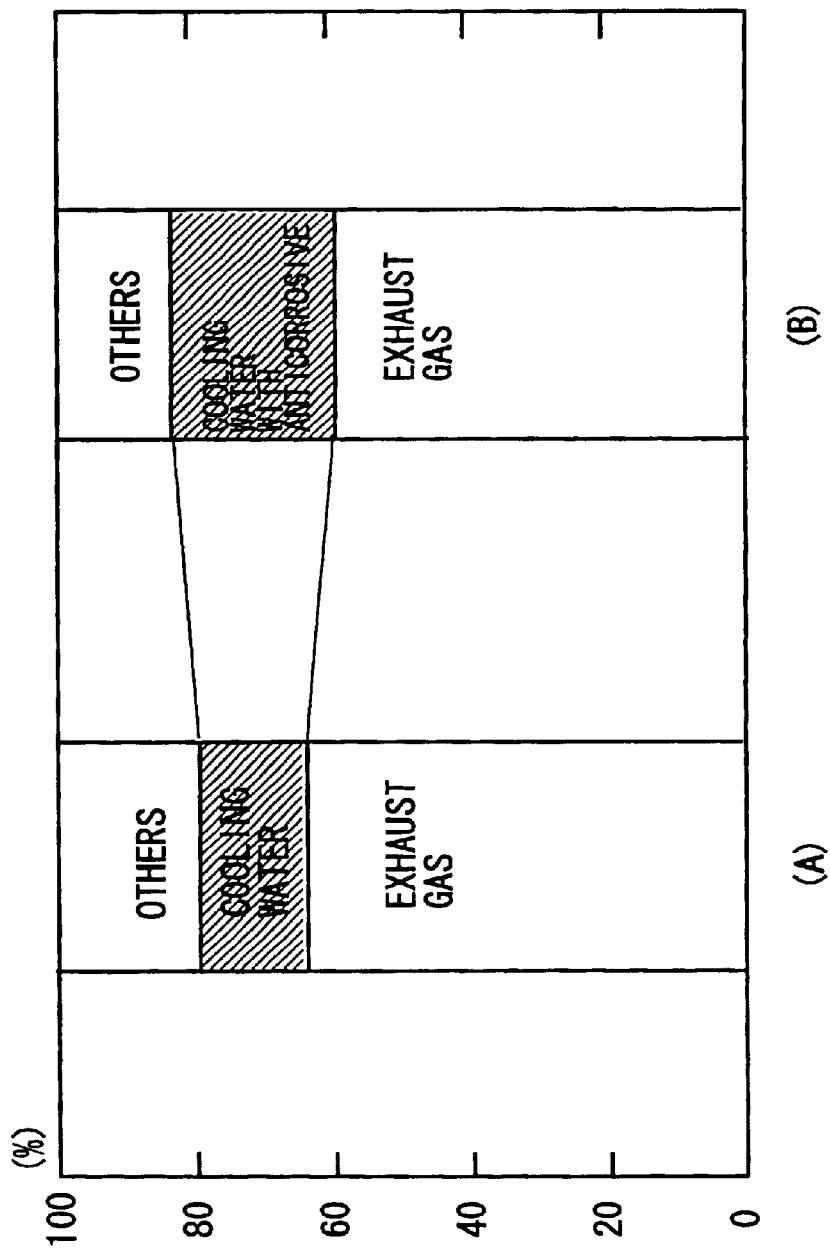
FIG. 4 shows a heat removing ratio of cooling water with anticorrosive chemicals and cooling water without anticorrosive chemicals.

FIG. 4 shows a heat removing ratio of cooling water with an anticorrosive chemical and cooling water without an anticorrosive chemical after three months of use. The heat removing ratio of the cooling water with the anticorrosive chemical compared to other cooling means, such as exhaust gas, is larger than the heat removing ratio of the cooling water without the anticorrosive chemical compared to other cooling means. Because adding the anticorrosive chemicals to the cooling water can prevent corrosion, the heat removing ratio of the cooling water compared to other cooling means is larger.

Because the cooling water can remove quantities of heat efficiently, the glass base material manufacturing system can manufacture a larger glass base material, which needs a greater quantity of heat quantity for manufacture. The productivity of the glass base material manufacturing system increases. The stress arising in the reaction vessel 82 is reduced so that the life of the reaction vessel 82 is improved and the breakage of the reaction vessel 82 caused by stress is reduced. Therefore the quality of the glass base material manufactured by the reaction unit 200 stabilizes. Moreover, the quantity of heat defused from the reaction vessel 82 is reduced so that the working environment for a user of the reaction unit 200 is improved.

The temperature of the cooling water inside the cooling channel 94 is kept between 40° C. and 90° C., preferably between 50° C. and 80° C., to increase the cooling efficiency and prevent condensation inside the reaction vessel 82.

The cooling water is circulated around the cooling channel 94 for a long period without exchange. Therefore, bacterium may increase in the cooling water and contaminate the cooling water such that the environment of the user of the reaction unit 200 is polluted. To prevent contamination of the cooling water by bacteria, the cooling water may contain an antiblastic agent that suppresses an increase of bacteria in the cooling water.

Although the present embodiment has been described by way of exemplary embodiments, it should be understood that many changes and substitutions may be made by those skilled in the art without departing from the spirit and the scope of the present embodiment which is defined only by the appended claims.

What is claimed is:

1. An apparatus for manufacturing a glass base material and maintaining the purity of a raw material which is a parent material of an optical fiber, comprising:
   a tank which contains a raw material of a glass base material to vaporize said raw material and generate the raw material in the gas phase;
   a temperature control unit consisting essentially of a temperature control circuit, at least one heat source, and at least one temperature sensor, which controls a temperature of said raw material to be constant; and
   a pressure control unit consisting essentially of at least one carrier gas control valve, at least one carrier gas supply unit, a pressure control circuit, and at least one pressure sensor which controls a pressure of said raw material in the gas phase to be constant.

2. An apparatus as claimed in claim 1, wherein said tank includes:
   a gas phase region which contains said raw material in the gas phase; and
   a liquid phase region which contains said raw material in the liquid phase.

3. An apparatus as claimed in claim 2, wherein said temperature control unit and said pressure control unit control a partial pressure of said raw material in said gas phase region by controlling an equilibrium vapor pressure in said gas phase region and said liquid phase region.

4. An apparatus as claimed in claim 3, wherein said carrier gas supply unit supplies a carrier gas for controlling said equilibrium vapor pressure, by bubbling said carrier gas through said liquid phase region.

5. An apparatus as claimed in claim 4, wherein said carrier gas supply unit has a carrier gas cylinder which supplies said carrier gas to said carrier gas supply unit.

6. An apparatus as claimed in claim 1, further comprising at least one reaction vessel where said raw material in gas phase is supplied and said glass base material is formed by hydrolyzing said raw material in gas-phase.

7. An apparatus as claimed in claim 6, further comprising a gas material supply valve that controls a flow rate of said raw material in gas phase from said tank to said reaction vessel.

8. An apparatus as claimed in claim 6, further comprising a filter provided between said tank and said gas material supply valve that filters said raw material in the gas phase supplied to said reaction vessel through said gas material supply valve, in order to prevent clogs from being generated in the gas material supply valve.

9. An apparatus as claimed in claim 8, wherein said filler is formed by a membrane that has a transmitting hole for filtering said raw material in gas phase.

10. An apparatus as claimed in claim 9, wherein a diameter of said transmitting hole is substantially from 0.1 $\mu$m to 100 $\mu$m.

11. An apparatus as claimed in claim 9, wherein said membrane is made of a politetrafluoroethylene.

12. An apparatus as claimed in claim 9, wherein said membrane is made of a stainless sinter.

13. An apparatus as claimed in claim 9, wherein said membrane is made of a stainless fiber.

14. An apparatus as claimed in claim 9, wherein said membrane is made of a ceramic fiber.

15. An apparatus as claimed in claim 9, wherein said filter has a plurality of layers of said membranes.

16. An apparatus as claimed in claim 6, wherein said reaction vessel has a cooling unit which cools said reaction vessel, and said cooling unit circulates cooling water which contains an anticorrosive chemical inside said cooling unit.

17. An apparatus as claimed in claim 16, wherein said anticorrosive chemical includes policarboxylic acid nitrite.

18. An apparatus as claimed in claim 17, wherein said cooling water contains said policarboxylic acid nitrite at a concentration from 1 ppm to 10 ppm.

19. An apparatus as claimed in claim 15, wherein said anticorrosive chemical further includes inorganic nitride.

20. An apparatus as claimed in claim 19, wherein said cooling water contains each of said policarboxylic acid nitrite and inorganic nitride at a concentration from 1 ppm to 10 ppm.

21. An apparatus as claimed in claim 16, wherein a temperature of said cooling water is substantially from 40° C. to 90° C.

22. An apparatus as claimed in claim 21, wherein said temperature of said cooling water is substantially from 50° C. to 80° C.

23. An apparatus as claimed in claim 16, wherein said cooling water contains an antiblastic agent that suppresses an increase of bacteria.

24. A method for manufacturing a glass base material and maintaining the purity of a raw material, comprising:
   providing a raw material of said glass base material,
   heating said raw material to vaporize said raw material and generate a raw material in the gas phase,
   supplying a carrier gas to reduce the partial pressure of said raw material in the gas phase to vaporize said raw material,
   controlling a temperature of said raw material to be constant by means of a temperature control unit consisting essentially of a temperature control circuit, at least one heat source, and at least one temperature sensor by adjusting said heating of said raw material, and
   controlling said partial pressure of said raw material to be constant by means of a pressure control unit consisting essentially of at least one carrier gas control valve, at least one carrier gas supply unit, a pressure control circuit, and at least one pressure sensor by adjusting said supply of said carrier gas.

25. A method as claimed in claim 24, further comprising; supplying and hydrolyzing said raw material in gas phase to form said glass base material.

26. A method as claimed in claim 25, further comprising; filtering said raw material in the gas phase and supplying and hydrolyzing the filtered raw material in the gas phase.

27. A method as claimed in claim 25, further comprising; controlling a flow rate of said raw material in the gas phase and supplying and hydrolyzing said flow rate controlled raw material in the gas phase.

28. A method as claimed in claim 25, wherein said supplying and hydrolyzing of said raw material occurs in a reaction vessel; and
   said hydrolyzing includes cooling said reaction vessel by circulating cooling water around said reaction vessel.

29. A method as claimed in claim 28, wherein said cooling water contains anticorrosive chemicals.

30. A method as claimed in claim 29, wherein said anticorrosive chemicals include policarboxylic acid nitrite.

31. A method as claimed in claim 30, wherein said cooling water contains said policarboxylic acid nitrite at a concentration substantially from 1 ppm to 10 ppm.

32. A method as claimed in claim 29, wherein said anticorrosive chemical further includes inorganic nitride.

33. A method as claimed in claim 32, wherein said cooling water contains inorganic nitride at a concentration substantially from 1 ppm to 10 ppm.

34. A method as claimed in claim 29, wherein said cooling regulates a temperature of said cooling water substantially from 40° C. to 90° C.

35. A method as claimed in claim 34, wherein said cooling regulates said temperature of said cooling water substantially from 50° C. to 80° C.

36. A method as claimed in claim 29, wherein said cooling water contains an antiblastic agent that suppresses an increase of bacteria in said cooling water.

* * * * *